United States Patent [19]

Haefner

[11] Patent Number: 4,984,467
[45] Date of Patent: Jan. 15, 1991

[54] TRANSDUCER FOR PRESSURES AND/OR VIBRATIONS AND METHOD FOR MANUFACTURING THEREOF

[75] Inventor: Hans W. Haefner, Aichach, Fed. Rep. of Germany

[73] Assignee: Pfister GmbH, Augsburg, Fed. Rep. of Germany

[21] Appl. No.: 322,142

[22] Filed: Mar. 13, 1989

[30] Foreign Application Priority Data

Mar. 15, 1988 [DE] Fed. Rep. of Germany ....... 3808605
Apr. 30, 1988 [DE] Fed. Rep. of Germany ....... 3814717

[51] Int. Cl.⁵ ............................. G01L 7/08; G01L 9/06
[52] U.S. Cl. ........................................ 73/721; 73/727; 73/729; 338/4
[58] Field of Search .................. 73/721, 727, 708, 754, 73/DIG. 4, 729, 115; 338/4, 42

[56] References Cited

U.S. PATENT DOCUMENTS 4,382,247  5/1983  Stecher .................................... 338/4
4,481,497  11/1984 Kurtz et al. ............................. 338/4
4,741,214  5/1988  Vidmantas ............................. 73/708

FOREIGN PATENT DOCUMENTS 1125205  5/1960  Fed. Rep. of Germany .
1299441  3/1966  Fed. Rep. of Germany .
3310538  3/1983  Fed. Rep. of Germany .
3631651  9/1986  Fed. Rep. of Germany .

OTHER PUBLICATIONS

"Drucksensoren in Dickschicht-Technologie", Vieten, Jul./Aug., 1987, pp. 435–437.
"Übersicht Uber Verschiedene Aufnehmerprinzipien fur die Elektrische Druckmessung", Hellwig, Jun. 1986, pp. 340–351.

Primary Examiner—Donald O. Woodiel
Attorney, Agent, or Firm—Armstrong, Nikaido, Marmelstein, Kubovcik & Murray

[57] ABSTRACT

A pressure transducer comprising a rigid body formed of noncreeping material with a ringlike shape and having a central opening, and a radially extending plane end surface, a diaphragm unitary with said rigid body and covering said opening at an end surface opposite to said plane end surface, and thickfilm resistor means applied to at least one of two main surfaces of said diaphragm.

17 Claims, 3 Drawing Sheets

TRANSDUCER FOR PRESSURES AND/OR VIBRATIONS AND METHOD FOR MANUFACTURING THEREOF

FIELD OF THE INVENTION

The invention relates to a transducer for picking-up pressures, vibrations and/or accelerations and converting them into electrical signals.

BACKGROUND OF THE ART

The U.S. Pat. No. 4,311,980 discloses a pressure transducer and a method for making it. A plurality of thickfilm resistors are screen-printed onto a deformable substrate specifically a circular diaphragm formed of ceramic material and clamped along its periphery. The resistors are circuit-connected to a Wheatstone bridge for measuring pressure or forces applied to the diaphragm. One problem of this known transducer is the assembly and safe securement of the diaphragm in mass production. Furthermore, the thickfilm resistors are subject to exterior influences leading to considerable deterioration. In many cases specific measures are required for securing the known transducer in a fixed position. Even then it is almost impossible to avoid a distortion of the diaphragm resulting in considerable non-linearities of the measurement.

The journal "messen prüfen automatisieren", June 1986, pages 340, 341 and July/August 1987 pages 435 to 437 discloses a pressure transducer using a diaphragm as explained above. Instead of clamping the diaphragm peripherally the diaphragm of this known transducer is secured to a rigid substrate by a circular glass layer leaving a cavity in the central part. This means that after heat treatment of the diaphragm another treatment of the whole unit is necessary in order to melt the glass frit. Depending on the quantity of glass frit used for forming the circular ring quite different cavities will result. For evacuation or connection to the atmosphere it is necessary to provide the substrate with a bore. This publication shows the application of a hybrid circuitry on the rear side of the substrate and the incorporation of such a transducer in a transducer housing.

The German Patent Publication No. 12 99 441 shows a flat pressure transducer including two opposing plates maintained in spaced relationship by a rectangular frame. At least one of the opposing inner surfaces of the two plates is provided with a strain gauge.

The German Patent No. 11 25 205 discloses a pressure transducer using a measuring member projecting with air-tight sealing from a housing. For compensating the influence of the atmospheric pressure the measuring member is set under atmospheric pressure from the opposite side of the projection.

The German Laid Open Publication No. 36 31 651 discloses an acceleration or vibration transducer using a circular diaphragm peripherally clamped between two rigid parts forming an air-tight cavity. At a central position the diaphragm is provided with a mass element such that upon application of an acceleration or vibration onto the unit the diaphragm is bent in the one or other direction resulting in a change of resistance of thickfilm resistors applied to one surface of the diaphragm by screen printing. With a principal illustration a canty-lever type of acceleration or vibration transducer is disclosed having the free end thereof provided with a mass element and one surface provided with a thickfilm resistor circuitry. Again, the practical embodiment with the clamped diaphragm has the disadvantages as outlined in connection with the pressure transducer according to U.S. Pat. No. 4,311,980. No practical embodiment is shown for the canty-lever type acceleration and vibration transducer.

The German Laid Open Publication No. 33 10 538 discloses a pressure transducer similar to that of the U.S. Pat. No. 4,311,980, however, with a rectangular shape of the diaphragm and the clamping elements.

SUMMARY OF THE INVENTION

It is a principal object of the invention to provide a transducer for picking-up pressures, accelerations and/or vibrations having a simple construction and being easy to produce.

It is a further object of the invention to provide a transducer for picking-up pressures, accelerations and/or vibrations having a self-contained construction simply to be incorporated in a device of use.

It is a still further object of the invention to provide a transducer for picking-up pressures, accelerations and/or vibrations with increased accuracy.

It is a further object of the instant invention to provide a method for manufacturing a transducer for picking-up pressures, accelerations and/or vibrations which is adapted for cost-effective mass production.

These and other objects of the invention are solved by a transducer for picking-up pressures comprising a rigid body formed of non-creeping material with a ring-like shape and having a central opening, and a radially extending plane end surface; a diaphragm unitary with said rigid body and covering said opening at an end surface opposite to said plane end surface; and thickfilm resistor means applied to at least one of two main surfaces of said diaphragm.

According to a further aspect of the invention there is provided a method for manufacturing transducers comprising the steps forming a rigid body of non-creeping material with a ring-like shape, a radially extending plane end surface and a central opening covered by a unitary diaphragm at an end surface opposite to said plane end surface; applying a pattern of thickfilm resistor means to at least one of two main surfaces of said diaphragm; and burning of the so formed transducer.

BRIEF DESCRIPTION OF THE DRAWINGS

FIG. 2 is a schematic plan view onto the transducer of FIG. 1a,

FIG. 6 is an elevational view in cross-section of a pressure measuring device using a transducer modified in respect of that of FIG. 1a;

DESCRIPTION OF PREFERRED EMBODIMENTS OF THE INVENTION

Figure 1A:
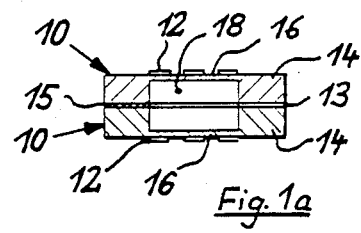
FIG. 1a and 1b are elevational views in vertical section of a first embodiment of the invention in two production steps according to the method of the invention.

FIG. 1a illustrates a first embodiment of a pressure transducer of the invention using two pressure transducer elements 10 connected with each other in symmetrical opposition.

Each pressure transducer element 10 comprises a ring or frame 14 whose central opening 18 is closed at the exterior surface by a diaphragm 16 having a thickness which is small as compared with that of the frame 14. The frame 14 and the diaphragm 16 are preferably unitary formed of ceramic material (or another noncreeping high-temperature resistive material). The simple shape enables mass production with a simple tool.

Figure 2:
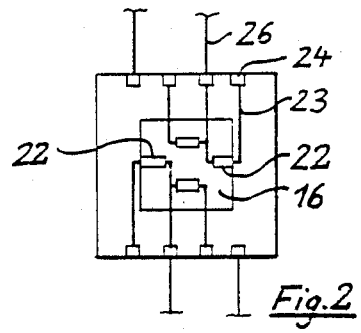

As may be clearly seen from FIG. 2 a well-known Wheatstone bridge formed of thickfilm resistors 22 are applied to one or both main surfaces, preferably the outer surface of the diaphragm 16 by screen printing or any other known thick film coating method, e.g. a thickfilm plotter. In FIG. 1a this Wheatstone bridge is generally marked with the reference numeral 12. The terminals of the thickfilm resistors 22 are connected by means of printed circuits 23 to ports 24 provided for connection to appropriate external connections as 26.

The thickfilm layers include as conductive components noble metals, oxides thereof or similar components intermixed in a glass frit selected of the group of bore silicates, aluminium silicates or lead silicates. This material composition is applied as a glass frit in a molten condition by means of screen printing or a thick film plotter in the form of a pen to the diaphragm 16. For further details as to the composition and application of such thickfilm resistors it is referred to the already mentioned U.S. Pat. Nos. 4,311,980 and 3,876,560.

As will be explained in detail in connection with further embodiments a single pressure transducer element 10 may be used as an independent pressure transducer with the advantage of a simple mass production of the unitary element. It should be noted, that with this embodiment the opening 18 has a rectangular, in particular squarelike shape giving the diaphragm 16 a higher sensitivity.

Figure 1B:
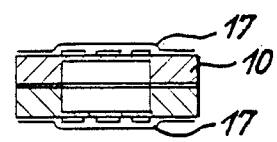

If desired, the thickfilm resistors 22 upon application onto the outer surface of the diaphragm 16 may be covered by a protective coating 17 formed of glass or similar material in a molten form improving the stability of the device and offering protection against exterior deterioration (see FIG. 1b).

Figure 3:
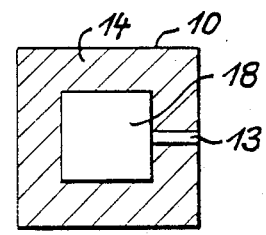
FIG. 3 is a plan view of the transducer according to FIG. 1a with removed upper part.

A particularly preferred embodiment results in connecting two preferably identical pressure transducer elements 10 in opposition to each other (FIGS. 1a and 1b) the end surfaces of the frames 14 of the two elements 10 being molten together by means of glass frit 15. Alternatively, bonding by adhesive may be used. The cavity formed by the openings 18 may be connected to the atmosphere by means of a passage 13 in case that the pressure is measured in relation to the atmospheric pressure. Alternatively, the cavity may be evacuated or filled with gas with the passage 13 sealed thereafter. The passage 13 results from forming it radially during application of the glass frit 15. Therefore, it is no more necessary to provide a bore into the glass body or the diaphragm. FIG. 3 clearly shows the passage 13.

Referring to FIG. 1b it should be noted that melting the two pressure transducer elements 10 together may be performed simultaneously with the application of the protective glass layer 17 followed by one burning process step.

It is a particular advantage of the pressure transducer according to the invention that it may be arranged buoyant in liquid or elastomeric material without any complicated fixings. In practice, the connectors 26 (FIG. 2) or very simple support elements are sufficient to maintain the pressure tansducer in position. This ensures that the inherent distorsional strains of the diaphragm are totally avoided.

It should be noted that a compensation of non-linearities may be achieved by arranging two or more pressure transducer elements 10 not in opposition, but in series with each other. Application of pressure results in a tension or strain of the thickfilm resistors of one diaphragm and in a compression of the thickfilm resistors of the other diaphragm. By appropriate connection of the resistors non-linearities may be reduced considerably. Again either the resistors of the individual diaphragms may be connected to a Wheatstone bridge or part of the resistors of one diaphragm may be connected with part of the resistors of the other diaphragm.

Figure 5:
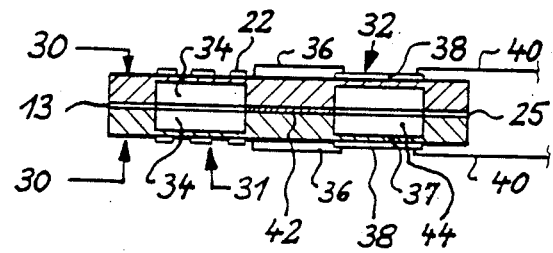
FIG. 5 is a view similar to that of FIG. 1a of a transducer having an symmetrical expansion.

FIG. 5 illustrates a further embodiment of the invention using pairs of pressure transducer elements arranged beside each other. The pairs may be arranged in opposition as shown in FIG. 5 or in series as just explained above.

With the embodiment of FIG. 5 expanded as compared with that of FIG. 1a an additional symmetry may be achieved. Specifically, with a pressure transducer 30 according to this embodiment beside a pressure transducer unit 31 a cell 32 of similar structure is formed including a diaphragm 37 supporting an integrated circuit 38 connected through leads 36 with thickfilm resistors 22 of the pressure transducer unit 31. Output conductors 40 transmit signals already processed in the integrated circuit 38. Again, connecting of the two halves of pressure transducer elements is achieved by glass frit 42 leaving radial passages 13 and 25, respectively, for the two cavities 34 and 44, respectively.

The symmetric design of the pressure transducer according to FIG. 5 results in a further improvement of the linearity of response and a particular simple possibility to arrange processing circuitry as close as possible to the pressure transducer.

It should further be noted, that for compensating non-linearities thickfilm resistors included in the integrated circuit 38 provided on the diaphragm 37 are subject to strains and compressions. Furthermore, the integrated circuitry 38 may be housed in the cavities 34 and 44, respectively Again, the thickfilm resistors may be applied to the interior surface of the associated diaphragm. It is important that by the multiplicity of pressure transducer pairs a signal with multiple amplitude may be derived enhancing processing and increasing the accuracy of measurement. Furthermore, hysteresis effects are reduced considerably.

Figure 4:
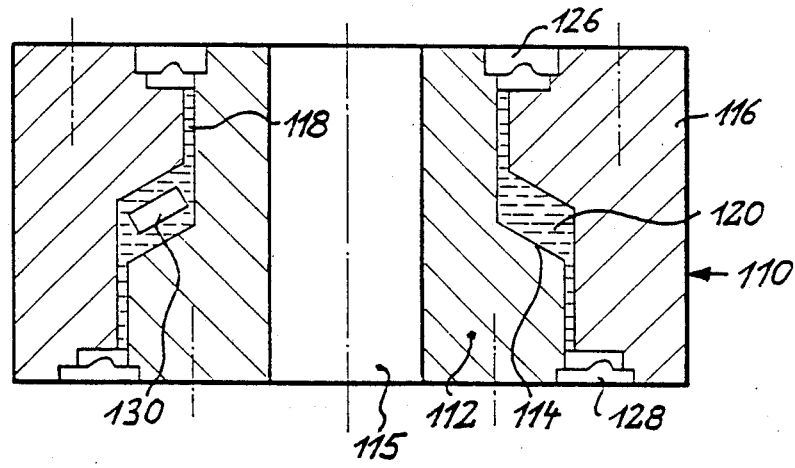
FIG. 4 is an elevational view in vertical section of a force measuring device using a transducer according to the invention.

FIG. 4 shows an example how a pressure transducer according to the invention may advantageously be used incorporated into an elastic joint between two concentric tubelike parts which arrangement may serve as a force measuring cell 110.

Specifically, there is provided an inner tubelike parts 112 having its exterior diameter increased along a predetermined region such that there is formed a circumferential, preferably inclined step 114. The inner part 112 is surrounded by an outer part 116 provided with a central passage 115 and having contours complementary to the exterior peripheral surface of the inner part 112 leaving a narrow circular gap 118 filled with preferably bubble-free elastomeric material. In the region of the step 114 of the inner part 112 the circular gap is somewhat expanded resulting in a conical space 120 filled with elastomeric material as well, having embedded therein at least one pressure transducer 130.

Applying a force or pressure to the outer part 116 from above (FIG. 4) with the inner part 112 vertically supported this force or pressure is transmitted practically frictionfree to the pressure transducer 130. Any lateral forces are completely deviated or shunted due to the elastomeric material in the narrow circular gap. It is to be noted, that the pressure transducer 130 measures the pressure present at the ring-piston cross-sectional surface between the inner part and the outer part.

It should be mentioned that several pressure transducers 130 may be peripherally distributed in the space 120 embedded in the elastomeric material. The pressure transducer 130 are connected by means of electrical leads, f.i. passed through the interior of the inner part 112 or wireless with an appropriate evaluation device.

The narrow gap 118 may be sealed at the opposite ends of the inner and outer part 112, 116 by means of annular sealings 126 and 128, respectively.

Applying pressure to the pressure transducer according to FIGS. 1a and 1b results in a twisting of the ring or frame 14 followed by the bending of the diaphragm 16. This may lead to considerable non-linearities of the pressure transducer. However, since two similar or identical pressure transducer elements 10 are arranged in opposition to each other and are fixedly connected with each other a similar force, however, with opposite direction, acts onto the two rings or frames 14. Thus, these forces are completely compensated due to the symmetry and the change in resistance of the thickfilm resistors 22 of the two pressure transducer elements 10 is only determined by the bending of the two diaphragms 16. Therefore, this unitary and symmetrical design of the pressure transducer elements 10 not only reduces production costs considerably, but results in an excellent error compensation.

Figure 6:
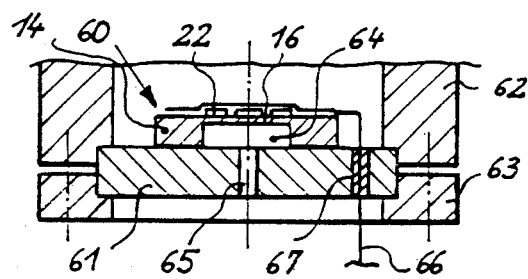
Figure 7:
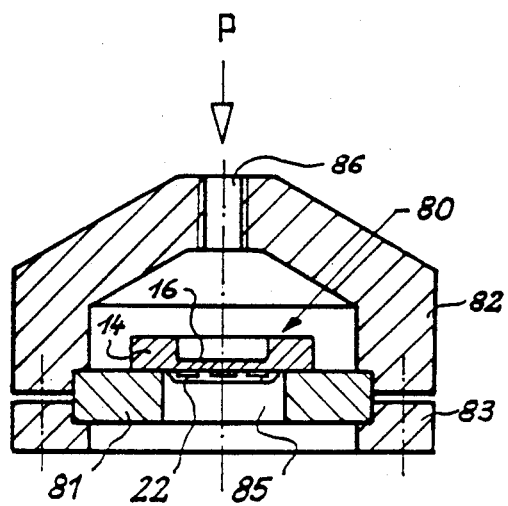
FIG. 7 is a view similar to that of FIG. 6 of a further pressure measuring device using a transducer according to the invention.

FIGS. 6 and 7 illustrate two embodiments using single pressure transducer elements as explained in detail in connection with FIGS. 1a and 1b.

Specifically, FIG. 6 shows a pressure transducer element 60 corresponding to the pressure element 10 of FIGS. 1a and 1b and being secured with its ring end surface on the plate 61 in a sealed manner, in particular molten thereon by means of a glass frit or bonded thereto. The plate 61 is, for example, supported between two elements 62 and 63 which may be formed tube- or ringlike and may be screwed together ensuring a sealed support of the plate 61 between the elements 62 and 63.

The pressure acting in the interior of element 62 is transmitted to the diaphragm 16 and the thickfilm resistors 22 as explained in connection with FIG. 1a. The diaphragm 16 is bent through correspondingly and the change in resistance of the thickfilm resistors 22 is a measure for the pressure acting in the interior of the element 62.

A space 64 below the diaphragm 16 and formed by the ring 14 may be connected with the atmosphere by means of a passage 65 formed through the plate 61 for relative pressure measurement.

The thickfilm resistors 22 are connected to an appropriate well-known evaluation device through a corresponding conductor 66 passed insolated through the plate 61.

With the embodiment according to FIG. 7 a pressure transducer element 80 is supported by a plate 81 in a reversed position as compared with the pressure transducer element 60 of FIG. 6. The plate 81 is provided with central opening 85 and is clamped between elements 82 and 83.

With pressure applied through a passage 86 formed through the element 82 onto the interior thereof this pressure is applied to the diaphragm 16 of the pressure transducer element 80 which diaphragm is bent down causing a corresponding change in resistance of the thickfilm resistors.

The embodiments of FIGS. 6 and 7 have the advantage that a very simple pressure transducer element may be secured in an extremely simple manner. Furthermore, since the end face of each ring of frame 14 is fixedly connected over a large area with the surface of the plate 61 and 81, respectively, twisting of the ring or frame 14 upon pressure application to the diaphragm of the pressure transducer element 60 or 80, respectively, is avoided or at least considerably reduced.

Figure 8:
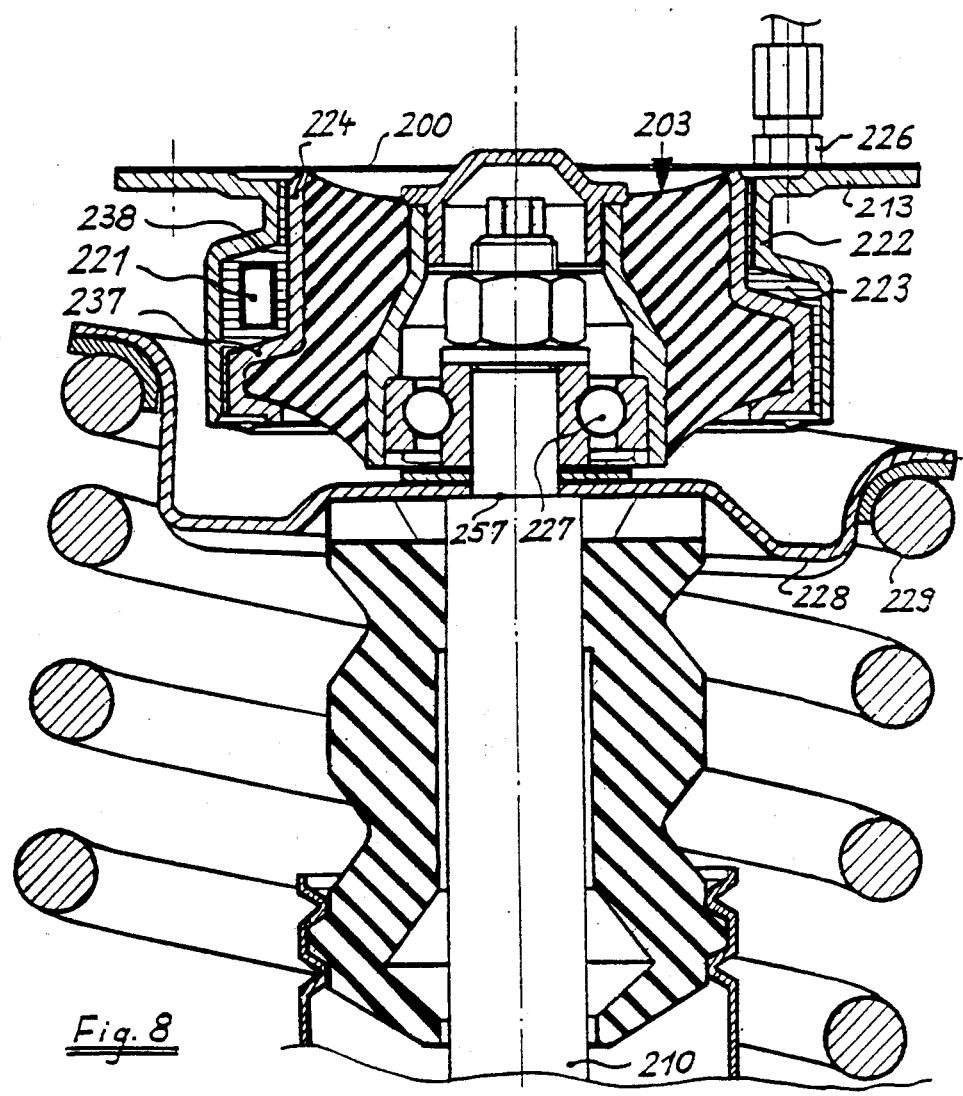
FIG. 8 is an elevational view in vertical section of a wheel load sensor for vehicles or planes using a transducer of the embodiments.

FIG. 8 shows a practical embodiment of the use of a pressure transducer 221 according to the invention in an elastic connection or joint between a spring strut 210 and the body 200 of a vehicle such that the pressure transducer 221 acts as a wheel load sensor.

This wheel load sensor includes an elastic unit generally marked with the reference numeral 203 having a preferably cylindrical exterior wall 224 surrounding elastomeric material (for example rubber) and having a radial expansion in the form of a rim 237. The elastic unit 203 is surrounded by a housing 222 having a shape essentially complementary to the contours of the outer wall 224. A relatively narrow gap is provided along an essential part of the peripheral surface and one or possibly several pockets 238 are formed peripherally in the region of the rim 237 only. In the space between the housing 222 and the outer wall 224 of the elastic unit elastomeric material 223 is provided in which practically buoyant or only supported by electrical leads one or several pressure transducers 221 are embedded.

By means of flanges 213 the housing 222 is connected to the body 200 of the vehicle for example by means of screws 226.

For sake of completeness it should be mentioned that a strut 210 supported by the wheels is surrounded usually by spring 229 supporting on a spring disk 228 abutting at a stop 257 of the strut 210. A ball bearing 227 insures rotational movability between the strut and the force measuring device.

With the above in mind it will be appreciated that this particularly preferred embodiment of a wheel load sensor is a very compact design due to the interlacing of the elastic unit with the housing 222 and due to the buoyant arrangement of the pressure transducer(s) 221. The integrated design of the overall arrangement results in an optimum construction without any specific securing of the pressure transducer with the considerable advantages explained above due to the buoyant arrangement of the pressure transducer. Specifically the last embodiment illustrates the variety of applications for the pressure transducer according to the invention with the advantage of an extremely cost effective design and assembly, the compact construction and the high accuracy.

Figure 9:
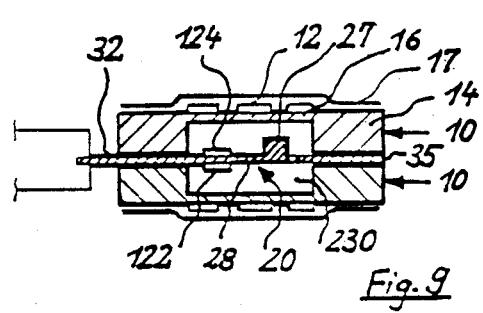
FIG. 9 is elevational view in vertical section of a combined pressure and vibration transducer according to the invention.

FIG. 9 shows a further embodiment of the invention of a unitary transducer both for pressure measurement and for measuring centrifugal forces, accelerations or vibrations.

Again this transducer uses two pressure transducer elements 10 molten together in opposition each comprising a diaphragm 16 having screen-printed thereon thickfilm resistors forming a Wheatstone bridge 12.

Now, with the instant embodiment in a cavity 230 formed by the two opposed pressure transducer elements 10 a vibration sensor 20 is arranged.

Figure 10:
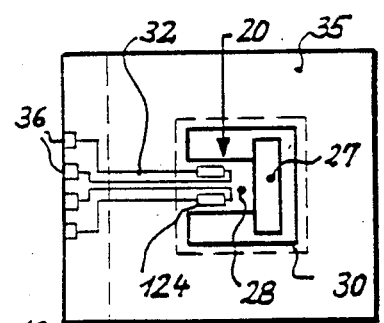
FIG. 10 is a plan view of the transducer of FIG. 9 with the upper part removed.

As may be seen more clearly in FIG. 10 this vibration sensor may comprise of resilient sheet material 35 preferably formed of steel with a shape adapted to that of the pressure transducer elements 10. The central region of the sheet material 35 corresponding to the cavity 30 is partially punched out leaving a tongue 28 forming a type of canty-lever with the free end thereof being provided with a mass element 27. One or both surfaces of the tongue 28 are provided with thickfilm resistors 122, 124 again forming a Wheatstone bridge for converting any bending of the tongue 28 in view of forces or vibrations acting upon the transducer into electrical signals. These signals are transmitted through printed circuit connections 32 to ports 36 for connection to an appropriate evaluation apparatus for the signals derived from the vibration sensor 20.

It will be appreciated that the vibration sensor 20 may be easily incorporated into the transducer during production. It is just inserted between the two pressure transducer elements 10 and molten together therewith by glass frit 15. Again, a radial passage 13 may connect the cavity 230 with the atmosphere or be used for evacuation offering with gas.

It will be appreciated that the transducer of this embodiment combines in a very simple way the measurement of pressures and momentary forces as centrifugal forces, accelerations, decelerations and/or vibrations acting upon the transducer.

It should further be appreciated that, if desired, a vibration or acceleration transducer without pressure measurement capability would be advantageously produced by just inserting the sheet material 34 between two raw bodies of the pressure transducer elements 10.

It will be appreciated that the same production method is applicable for the transducer of this embodiment as with the embodiment according to FIGS. 1 to 3.

Such a combined unitary transducer for picking-up both pressures and centrifugal forces or vibrations may be conveniently used instead of the pressure transducer 221 in a strut construction of a vehicle according to FIG. 8.

Whilst the pressure transducer 221 may be randomly positioned in the space 223 the combined unitary transducer should be positioned such that centrifugal forces, accelerations or vibrations act upon the transducer in a direction normal to the main surface of the tongue 28.

Thus, if the combined unitary transducer is situated in upright position with the main surface of the tongue 28 facing the direction of linear movement of the vehicle any acceleration or deceleration may be determined by the transducer. Alternatively, if the main surface of the tongue 28 faces a direction lateral to the forward movement of the vehicle any centrifugal forces acting upon the vehicle may be determined.

Situating the combined unitary transducer in a horizontal position (as shown in FIG. 9) within the elastomeric material in the space 223 would permit the picking-up of momentary changes in wheel load, i.e. of any vibrations caused by the roughness of the road.

Of course, several combined unitary transducers may be embedded in the elastomeric material of the space 223 with different alignments or may be placed at different positions and elements of the vehicle.

While the invention has been particularly shown and described in reference to preferred embodiments thereof, it will be understood by those skilled in the art that changes in form and details may be made therein without departing from the spirit and scope of the invention.

What is claimed:

1. A pressure transducer comprising:
   two rigid bodies, each being formed of non-creeping material with a ring-like shape around a central opening, and a radially extending plane end surface;
   substantially plane diaphragms, each being formed integral to said rigid body and covering said opening at an end surface opposite to said plane end surface, said diaphragm having a thickness which is small as compared with that of said rigid body; and
   thickfilm resistor means applied to at least one of upper and lower surfaces of each of said diaphragms, wherein each of said two rigid bodies includes one of said diaphragms, and wherein said two rigid bodies are fixedly connected at plane end surfaces thereof forming a transducer unit with said thickfilm resistor means of each of said diaphragms being circuit connected.

2. The pressure transducer of claim 1, wherein said non-creeping material is a ceramic material, and wherein said diaphragm has an upper surface which flushes with said end surface of said rigid body.

3. The pressure transducer of claim 1, wherein said opening is of rectangular shape said thickfilm resistor means having a longitudinal direction parallel to a longitudinal direction of one edge of said rectangular opening.

4. The pressure transducer of claim 1, wherein said plane end surfaces are fixedly connected together by a molten glass frit.

5. The pressure transducer of claim 1, wherein a cavity formed by said openings of said two bodies is connected with the exterior by a radial passage provided at said plane end surface of at least one of said bodies.

6. The pressure transducer of claim 1, wherein two of said bodies provided with said diaphragm are fixedly connected together with said plane end surface of one of said body being molten by a glass frit to said end surface opposite to said plane end surface of the other of said bodies.

7. The pressure transducer of claim 1, wherein said transducer unit is expanded in a direction parallel to said plane end surfaces by duplication and wherein at least one of said diaphragms of said duplicated bodies are provided with an integrated circuitry connected to said thickfilm resistors means and having ports for connection to processing means.

8. The pressure transducer of claim 1 further comprising means for picking-up varying forces, arranged within a cavity formed by said openings of said two bodies, said means comprising a resilient member provided with a mass element and held within said cavity for excursion upon application of said varying forces; and transducer means for converting said excursion of said resilient member into electrical signals.

9. The pressure transducer of claim 8, wherein said transducer means are strain gauge type means applied to surfaces of said resilient member.

10. The pressure transducer of claim 9, wherein said strain gauge means are formed of thickfilm resistors applied to said surfaces of said resilient member.

11. The pressure transducer of claim 8, wherein said resilient member is formed of sheet material as a tongue clamped at one end between said plane end surfaces of said two bodies and having said mass element attached at a free end opposite to said clamped end.

12. The pressure transducer of claim 11, wherein said sheet material essentially has the form of said plane end surfaces of said bodies with a central part being removed with the exception of said tongue.

13. The pressure transducer of claim 8, wherein said resilient member is formed as a diaphragm clamped between said plane end surfaces of said bodies.

14. The pressure transducer of claim 8, wherein said transducer unit is embedded in elastomeric material and positioned such that said varying forces are acting normal to said main surfaces of said resilient member.

15. The pressure transducer of claim 78, wherein said transducer unit is embedded in elastomeric material provided between two rigid parts of a strut of a vehicle said transducer unit being positioned such that said varying forces are acting normal to said main surfaces of said resilient member.

16. The pressure transducer of claim 1, wherein said transducer unit is embedded in elastomeric material contained in an elastic joint between two rigid parts.

17. The pressure of claim 1, wherein said transducer unit is embedded in elastomeric material provided between two rigid parts of a strut of a vehicle.

* * * * *